US012689210B2

(12) United States Patent
Chen et al.

(10) Patent No.: US 12,689,210 B2
(45) Date of Patent: Jul. 21, 2026

(54) POWER SUPPLY CIRCUIT AND CONTROL METHOD THEREOF

(71) Applicant: Huawei Digital Power Technologies Co., Ltd., Shenzhen (CN)

(72) Inventors: Baoguo Chen, Dongguan (CN); Hua Jiang, Shenzhen (CN); Yiyi Huang, Dongguan (CN); Hui Dong, Wuhan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/653,079

(22) Filed: May 2, 2024

(65) Prior Publication Data

US 2024/0283244 A1 Aug. 22, 2024

Related U.S. Application Data

(63) Continuation of application No. PCT/CN2022/103461, filed on Jul. 1, 2022.

(30) Foreign Application Priority Data

Nov. 29, 2021 (CN) .......................... 202111431460.6

(51) Int. Cl.
*H02J 1/08* (2026.01)

(52) U.S. Cl.
CPC .................................... *H02J 1/084* (2020.01)

(58) Field of Classification Search
CPC .................................... H02J 1/08; H02J 1/084
See application file for complete search history.

(56) References Cited

FOREIGN PATENT DOCUMENTS

| CN | 206894605 U | 1/2018 |
| CN | 109660233 A | 4/2019 |
| CN | 212726857 U | 3/2021 |
| CN | 114256829 A | 3/2022 |

*Primary Examiner* — Robert L Deberadinis
(74) *Attorney, Agent, or Firm* — Maier & Maier, PLLC

(57) ABSTRACT

A power supply circuit may include a plurality of first switches, a plurality of second switches, and a third switch. The plurality of first switches may be in a one-to-one correspondence with the plurality of load units, and the plurality of second switches may be in a one-to-one correspondence with the plurality of load units. A first end of each first switch and a first end of the third switch may be connected to a first end of a direct current power supply, a second end of each first switch may be connected to a first end of a corresponding second switch and a first end of a corresponding load unit, a second end of each second switch may be connected to a second end of the third switch, and a second end of the direct current power supply may be connected to a second end of each load unit.

20 Claims, 7 Drawing Sheets

100

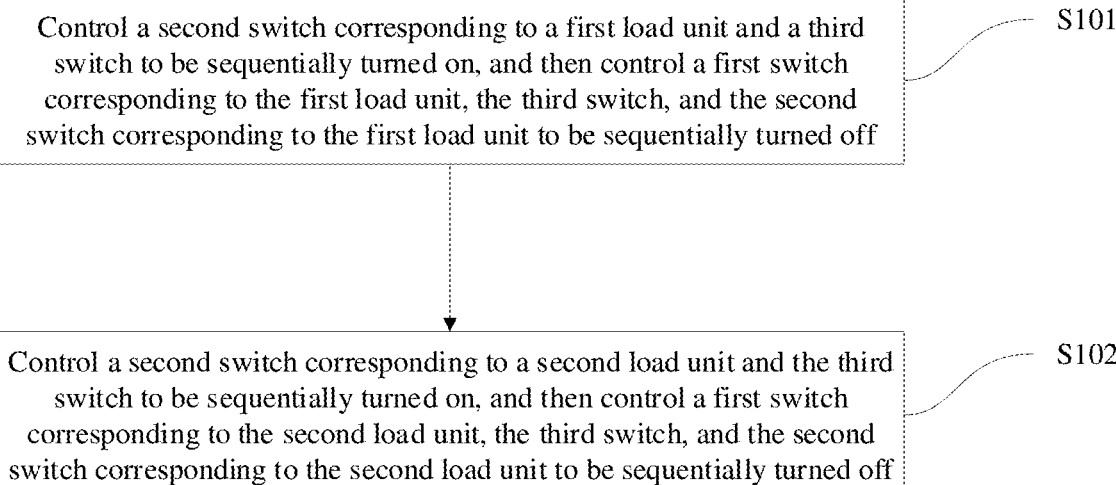

Control a second switch corresponding to a first load unit and a third switch to be sequentially turned on, and then control a first switch corresponding to the first load unit, the third switch, and the second switch corresponding to the first load unit to be sequentially turned off — S101

Control a second switch corresponding to a second load unit and the third switch to be sequentially turned on, and then control a first switch corresponding to the second load unit, the third switch, and the second switch corresponding to the second load unit to be sequentially turned off — S102

FIG. 9

POWER SUPPLY CIRCUIT AND CONTROL METHOD THEREOF

CROSS-REFERENCE TO RELATED APPLICATIONS

This application is a continuation of International Application No. PCT/CN2022/103461, filed on Jul. 1, 2022, which claims priority to Chinese Patent Application No. 202111431460.6, filed on Nov. 29, 2021. The disclosures of the aforementioned applications are hereby incorporated by reference in their entireties.

TECHNICAL FIELD

The embodiments relate to the field of energy technologies, a power supply circuit, and a control method thereof.

BACKGROUND

With rapid development of a communication technology, a communication base station generally has a plurality of load units of different types. Therefore, a communication power supply of the communication base station generally supplies power to the plurality of load units of different types through a plurality of output ends. In a time period in which service traffic is low, some or all of the load units may be turned off through a power supply circuit, to meet an energy saving requirement, and a loss and operating costs of the communication base station are also reduced.

At present, a power supply circuit in the conventional technology may use a plurality of contactors (such as large-capacity contactors) with a strong capability of cutting off the load units to implement hierarchical power-off of the plurality of load units. However, because each contactor needs to be disposed with an arc extinguishing apparatus configured to reduce an electric arc generation probability of the contactor, the power supply circuit is large in size and has high costs.

SUMMARY

The embodiments provide a power supply circuit and a control method thereof, where a plurality of first switches, a plurality of second switches, and a third switch are disposed, so that the power supply circuit is small in size and has low costs. In addition, hierarchical power-off of a plurality of load units is implemented by controlling a time sequence of turning on and turning off the plurality of first switches, the plurality of second switches, and the third switch (that is, the plurality of load units are sequentially powered off, so that some or all of the load units stop working, that is, some or all of the load units are sequentially disconnected from a direct current power supply).

According to a first aspect, this embodiments provide a power supply circuit, and the power supply circuit may include a plurality of first switches, a plurality of second switches, and a third switch. The plurality of first switches may be in a one-to-one correspondence with a plurality of load units, and the plurality of second switches may be in a one-to-one correspondence with the plurality of load units.

Optionally, a first end of each first switch is connected to a first end of a direct current power supply, a second end of each first switch is connected to a first end of a corresponding load unit in the plurality of load units, a first end of each second switch is connected to the first end of the corresponding load unit, a second end of each second switch is connected to a second end of the third switch, a first end of the third switch is connected to the first end of the direct current power supply, and a second end of the direct current power supply is connected to a second end of each of the plurality of load units.

The power supply circuit is disposed with the plurality of first switches, the plurality of second switches, and the third switch. In a process of hierarchical power-off of the plurality of load units, the third switch provides a power-off path for each load unit. In other words, the third switch is a shared switch, so that the power supply circuit is small in size and has low costs.

It should be noted that, the power supply circuit may not only implement hierarchical power-off of the plurality of load units, so that an energy saving requirement is met, and a loss and operating costs of a communication base station are reduced. In addition, the power supply circuit may further implement hierarchical power-on of the plurality of load units by using the plurality of first switches (that is, the plurality of load units are sequentially powered on, so that some or all of the load units start to work, that is, some or all of the load units are sequentially connected to the direct current power supply, and power supply of some or all of the load units is implemented through the direct current power supply), so that impact on the power supply circuit and the direct current power supply is reduced.

In a possible implementation, the power supply circuit provided by this embodiment may further include a control unit. The control unit may be connected to each of the plurality of first switches, each of the plurality of second switches, and the third switch.

Based on the foregoing connection relationship, it may be understood that the control unit may be configured to control at least two first switches of the plurality of first switches, and at least two corresponding second switches of the plurality of second switches and third switch to be turned on or turned off, to implement hierarchical power-off of at least two corresponding load units of the plurality of load units.

In an example, each first switch may be a mechanical switch such as a relay or a contactor. In addition to the relay and the contactor, each first switch may alternatively be another switch with a small loss. This is not limited in this embodiment.

In another example, each second switch may be a relay, a contactor, or a semiconductor switch (that is, any one of the relay, the contactor, and the semiconductor switch). Each second switch may alternatively be another switch. This is not limited in this embodiment.

In still another example, the third switch may be a relay (a relay with a strong capability of cutting off the load unit), a contactor, or a semiconductor switch (that is, any one of the relay, the contactor, and the semiconductor switch). The third switch may alternatively be another switch. This is not limited in this embodiment.

Optionally, the semiconductor switch may be an insulated gate bipolar transistor (IGBT), a metal-oxide-semiconductor field-effect transistor (MOSFET), or a triode (triode). The semiconductor switch may alternatively be another switch. This is not limited in this embodiment.

In a possible implementation, the power supply circuit may further include an absorption circuit, and the absorption circuit may be connected in parallel to the third switch.

Optionally, the absorption circuit may include a resistor and a capacitor. The resistor can be connected in series to the capacitor.

It should be noted that the absorption circuit may also be referred to as a buffer circuit and may be configured to buffer a voltage and a current borne by the third switch at a moment when the third switch is turned on and a moment when the third switch is turned off.

According to a second aspect, the embodiments provide a communication power supply, where the communication power supply may include a direct current power supply and the power supply circuit provided in the first aspect and the possible implementations of the first aspect.

The direct current power supply may be connected to the power supply circuit, and the direct current power supply and the power supply circuit may be separately connected to a plurality of load units.

Therefore, the communication power supply may be configured to supply power to each of the plurality of load units through the direct current power supply and the power supply circuit.

According to a third aspect, the embodiments provide a communication base station, where the communication base station may include a plurality of load units and the communication power supply provided in the second aspect. The communication power supply may be connected to each of the plurality of load units.

According to a fourth aspect, the embodiments provide a power supply circuit control method, where the method is used to control the power supply circuit provided in the first aspect and the possible implementations of the first aspect, to implement hierarchical power-off or hierarchical power-on of at least two load units of a plurality of load units.

Optionally, the control method may include:

controlling a second switch corresponding to a first load unit in the at least two load units and a third switch to be sequentially turned on, and controlling a first switch corresponding to the first load unit, the third switch, and the second switch corresponding to the first load unit to be sequentially turned off, to power off the first load unit; and controlling a second switch corresponding to a second load unit in the at least two load units and the third switch to be sequentially turned on and controlling a first switch corresponding to the second load unit, the third switch, and the second switch corresponding to the second load unit to be sequentially turned off, to power off the second load unit.

Hierarchical power-off of the at least two load units may be implemented through the foregoing steps, so that a loss and operating costs of a communication base station are reduced.

When the second switch corresponding to the load unit is turned on and the third switch is turned on, a bypass formed by the second switch and the third switch is conducted, and there is no voltage at both ends of the first switch. In this case, no electric arc is generated in a process of turning off the first switch. Therefore, the first switch is not damaged. In addition, the power supply circuit does not need to be disposed with an arc extinguishing apparatus, so that the power supply circuit is small in size and has low costs. In addition, reliability and security of the power supply circuit can be improved.

According to the power supply circuit control method, hierarchical power-off of the plurality of load units may be implemented by controlling a time sequence of turning on and turning off a plurality of first switches, a plurality of second switches, and the third switch.

In a possible implementation, the control method may further perform the following process:

controlling the first switch corresponding to the first load unit and the first switch corresponding to the second load unit to be sequentially turned on, to implement hierarchical power-on of the first load unit and the second load unit.

It should be noted that, hierarchical power-on of another load unit in the plurality of load units may be implemented according to the foregoing process. Details are not described.

It should be understood that the second aspect to the fourth aspect are consistent with the first aspect and beneficial effects achieved by the aspects and corresponding implementations are similar. Details are not described again.

BRIEF DESCRIPTION OF DRAWINGS

To describe the embodiments more clearly, the following briefly describes the accompanying drawings used in describing embodiments or the conventional technology. Apparently, the accompanying drawings in the following description show some embodiments, and a person of ordinary skill in the art may still derive other drawings from these accompanying drawings without creative efforts.

FIG. 9 is a schematic flowchart of a power supply circuit control method according to an embodiment.

DETAILED DESCRIPTION OF EMBODIMENTS

Figure 1:
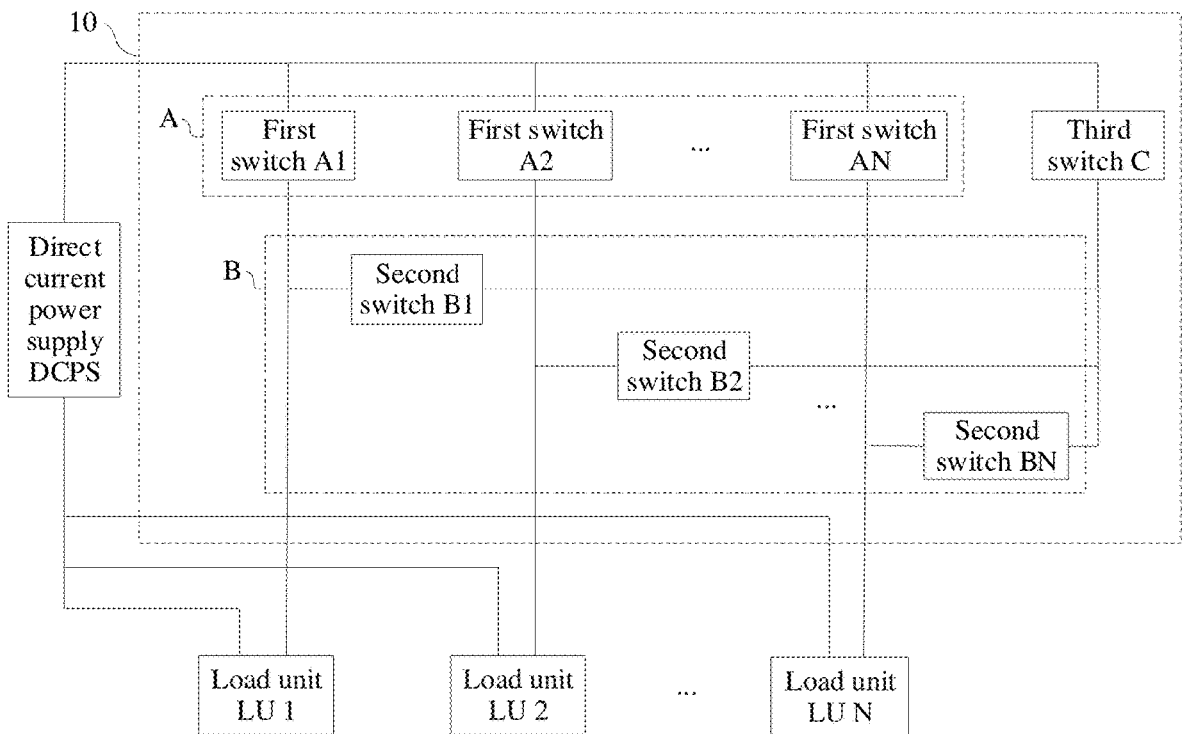
FIG. 1 is a schematic diagram of a structure of a power supply circuit according to an embodiment.

The following describes the embodiments with reference to accompanying drawings.

To make the objectives, solutions, and advantages clearer, the following clearly describes the embodiments with reference to the accompanying drawings. It is clear that, the described embodiments are merely some rather than all of the embodiments. All other embodiments obtained by a person of ordinary skill in the art based on the embodiments without creative efforts shall fall within the scope of the embodiments.

In the embodiments and accompanying drawings, terms "first", "second", and the like are merely intended for distinguishing and description and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed but may include other steps or units that are not literally listed or that are inherent to such processes, methods, products, or devices.

It should be understood that "at least one (item)" refers to one or more and "a plurality of" refers to two or more. The term "and/or" is used for describing an association relationship between associated objects and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items" or a similar expression means any combination of these items, including any combination of a single item or a plurality of items. For example, at least one item of a, b, or c may indicate a, b, c, "a and b", "a and c", "b and c", or "a, b, and c", where a, b, and c may be singular or plural.

With rapid development of a communication technology, a communication base station generally has a plurality of load units of different types. The load units can be classified into a primary load and a secondary load. The primary load may be a transmission device (for example, a microwave transmission device and a fiber transmission device). The secondary load may be a service device (for example, a wireless transmitting device).

Therefore, a communication power supply of the communication base station may supply power to the plurality of load units of different types through a plurality of output ends. In a time period in which service traffic is small, some or all of the load units may be turned off through a power supply circuit, to meet an energy saving requirement, and a loss and operating costs of the communication base station are also reduced.

In the power supply circuit that uses a plurality of contactors (that is, large-capacity contactors) with a strong capability of cutting off the load unit to implement hierarchical power-off of the plurality of load units, because there are a large quantity of contactors, and each contactor needs to be disposed with an arc extinguishing apparatus configured to reduce an electric arc generation probability of the contactor, the power supply circuit is large in size and has high costs.

To overcome disadvantages of a large size and the high costs of the power supply circuit, an embodiment provides a power supply circuit, which is shown in FIG. 1. The power supply circuit 10 may include N first switches A (including a first switch A1, a first switch A2, . . . , and a first switch AN in FIG. 1), N second switches B (including a second switch B1, a second switch B2, . . . , and a second switch BN in FIG. 1), and a third switch C.

Optionally, the N first switches may be in a one-to-one correspondence with N load units, and the N second switches may also be in a one-to-one correspondence with the N load units.

For example, the first switch A1 may correspond to a load unit (LU) 1, and the second switch B1 may also correspond to the LU 1.

For another example, the first switch A2 may correspond to a LU 2, and the second switch B2 may also correspond to the LU 2.

For still another example, the first switch AN may correspond to a LU N, and the second switch BN may also correspond to the LU N.

Based on the foregoing correspondence, the following is further provided.

A first end of each first switch (such as an upper end of each first switch in FIG. 1) may be connected to a first end of a direct current power supply (DCPS) (such as an upper end of the DCPS in FIG. 1), and a second end of each first switch (such as a lower end of each first switch in FIG. 1) may be connected to a first end of a corresponding load unit in the N load units. A first end of each second switch (such as a left end of each second switch in FIG. 1) may be connected to the first end of the corresponding load unit (in other words, the second end of each first switch and the first end of each second switch are separately connected to the first end of the corresponding load unit), and a second end of each second switch (such as a right end of each second switch in FIG. 1) may be connected to a second end of a third switch C (such as a lower end of the third switch C in FIG. 1). A first end of the third switch C (such as an upper end of the third switch C in FIG. 1) may be connected to the first end of the DCPS, and a second end of the DCPS (such as a lower end of the DCPS in FIG. 1) may be connected to a second end of each of the N load units.

The power supply circuit provided in this embodiment is disposed with the plurality of first switches, the plurality of second switches, and the third switch. In a process of hierarchical power-off of the plurality of load units, the third switch provides a power-off path for each load unit. In other words, the third switch is a shared switch, so that the power supply circuit is small in size and has low costs.

It should be explained that power-off may indicate the load unit to stop working. In other words, the load unit is disconnected from the direct current power supply. In this case, the hierarchical power-off may indicate the plurality of load units to be sequentially powered off, so that some or all load units stop working. In other words, some or all load units are sequentially disconnected from the direct current power supply.

Similarly, power-on may indicate the load unit to start working. In other words, the load unit is connected to the direct current power supply. In this case, hierarchical power-on may indicate the plurality of load units to be sequentially powered on, so that some or all of the load units start to work. In other words, some or all of the load units are sequentially connected to the direct current power supply, and power supply of some or all of the load units is implemented through the direct current power supply.

It should be further noted that, the power supply circuit provided in this embodiment may not only implement the hierarchical power-off of the plurality of load units, so that an energy saving requirement is met, and a loss and operating costs of a communication base station are reduced. In addition, the power supply circuit provided in this embodiment may further implement the hierarchical power-on of the plurality of load units by using the plurality of first switches, so that impact on the power supply circuit and the direct current power supply is reduced.

In a possible implementation, the power supply circuit 10 provided in this embodiment may further include a control unit (CU). It should be noted that the CU is not shown in FIG. 1.

Optionally, the CU may be connected to each of the N first switches, each of the N second switches, and the third switch C.

Based on the foregoing connection relationship, the control unit may be configured to control at least two first switches (for example, the first switch A1 and the second switch A2) of the N first switches, at least two corresponding second switches (for example, the second switch B1 and the second switch B2) of the N second switches, and the third switch C to be turned on or turned off, to implement the hierarchical power-off of at least two corresponding load units (for example, the load unit LU 1 and the load unit LU 2) of the N load units.

In an example, each first switch may be a mechanical switch such as a relay or a contactor. In addition to the relay and the contactor, each first switch may alternatively be another switch. This is not limited in this embodiment.

In another example, each second switch may be a relay, a contactor, or a semiconductor switch (that is, any one of the relay, the contactor, and the semiconductor switch). Each second switch may alternatively be another switch. This is not limited in this embodiment.

In still another example, the third switch C may be a relay (a relay with a strong capability of cutting off the load unit), a contactor, or a semiconductor switch (that is, any one of the relay, the contactor, and the semiconductor switch). The third switch C may alternatively be another switch. This is not limited in this embodiment.

Optionally, the semiconductor switch may be an insulated gate bipolar transistor (IGBT), a metal-oxide-semiconductor field-effect transistor (MOSFET), or a triode (triode). The semiconductor switch may alternatively be another switch. This is not limited in this embodiment.

Figure 2:
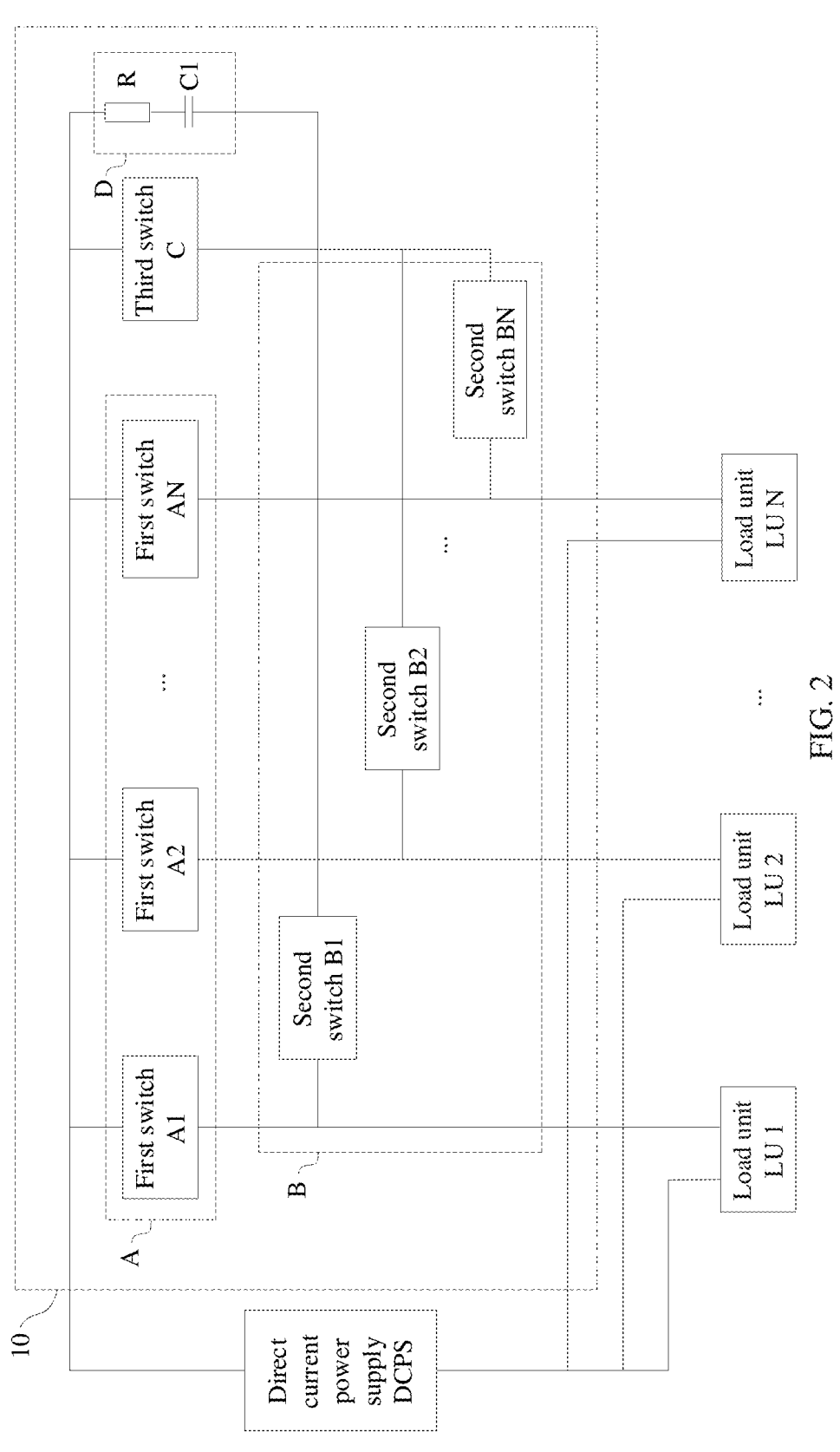
FIG. 2 is a schematic diagram of a structure of a power supply circuit according to an embodiment.

In a possible implementation, the power supply circuit 10 provided in this embodiment may further include an absorption circuit D. As shown in FIG. 2, the absorption circuit D may be connected in parallel to the third switch C.

The absorption circuit D may include a resistor R and a capacitor C1. The resistor R may be connected in series to the capacitor C1.

It should be noted that the absorption circuit may also be referred to as a buffer circuit and may be configured to buffer a voltage and a current borne by the third switch at a moment when the third switch is turned on and a moment when the third switch is turned off.

The following describes the power supply circuit provided in this embodiment by using an example in which each first switch and each second switch is a relay, and the third switch is a metal-oxide-semiconductor field-effect transistor (a MOS transistor for short) including an anti-parallel diode.

Figure 3:
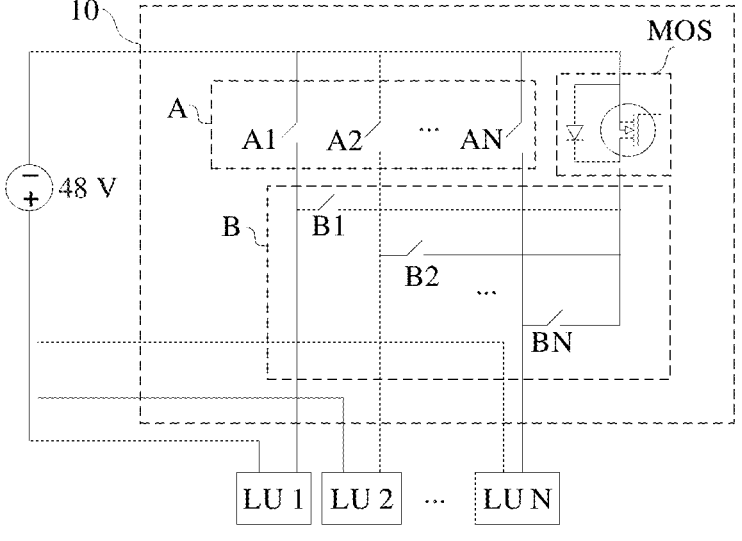
FIG. 3 is a schematic diagram of a structure of a power supply circuit according to an embodiment.

As shown in FIG. 3, the power supply circuit 10 may include N first switches A (including a first switch A1, a first switch A2, . . . , and a first switch AN in FIG. 3), N second switches B (including a second switch B1, a second switch B2, . . . , and a second switch BN in FIG. 3), and a MOS transistor (that is, a third switch).

Similar to FIG. 1, the N first switches and the N second switches may be in a one-to-one correspondence with N load units.

For example, the first switch A1 may correspond to the second switch B1 and a load unit LU 1.

For another example, the first switch A2 may correspond to the second switch B2 and a load unit LU 2.

For still another example, the first switch AN may correspond to the second switch BN and a load unit LU N.

Based on the foregoing correspondence, the following is further provided:

A first end (that is, an upper end of each first switch in FIG. 3) of each first switch may be connected to a first end (that is, a negative end of the 48 V direct current power supply in FIG. 3) of a 48 V direct current power supply, and a second end (that is, a lower end of each first switch in FIG. 3) of each first switch may be connected to a first end (which may be a negative end of the load unit) of a corresponding load unit in the N load units. A first end (that is, a left end of each second switch in FIG. 3) of each second switch may be connected to the first end of the corresponding load unit. In other words, the second end of each first switch and the first end of each second switch are separately connected to the first end of the corresponding load unit. A second end of each second switch may be connected to a second end (that is, a drain end of the MOS transistor in FIG. 3) of the MOS transistor, a first end (that is, a source end of the MOS transistor in FIG. 3) of the MOS transistor may be connected to the first end (that is, the negative end of the 48 V direct current power supply in FIG. 3) of the 48 V direct current power supply, and a second end (that is, a positive end of the 48 V direct current power supply in FIG. 3) of the 48 V direct current power supply may be connected to a second end (which may be a positive end of the load unit) of each of the N load units.

Similar to FIG. 1, each first switch, each second switch, and one MOS transistor in FIG. 3 may all be connected to a control unit CU. In other words, the CU may control each first switch and each second switch in FIG. 3 to be turned on and turned off and may also control the MOS transistor in FIG. 3 to be turned on and turned off.

The power supply circuit shown in FIG. 3 is disposed with the N first switches, the N second switches, and the MOS transistor. In a process of hierarchical power-off of a plurality of load units, the MOS transistor provides a power-off path for each load unit. In other words, the MOS transistor is a shared switch, so that the power supply circuit is small in size and has low costs.

It should be noted that, the power supply circuit in FIG. 3 in this embodiment may not only implement the hierarchical power-off of the plurality of load units, so that an energy saving requirement is met, and a loss and operating costs of a communication base station are reduced.

In a possible implementation, the power supply circuit 10 shown in FIG. 3 may further include a control unit CU (not shown in FIG. 3).

Optionally, the control unit CU may be connected to each of the N first switches, each of the N second switches, and the MOS transistor. It should be noted that the control unit CU may be connected to a control end of the MOS transistor.

Based on the foregoing connection relationship, the control unit CU may be configured to control at least two first switches (for example, the first switch A1 and the second switch A2) of the N first switches, at least two corresponding second switches (for example, the second switch B1 and the second switch B2) of the N second switches, and the MOS transistor to be turned on or turned off, to implement hierarchical power-off of at least two corresponding load units (for example, the load unit LU 1 and the load unit LU 2) of the N load units.

Figure 4:
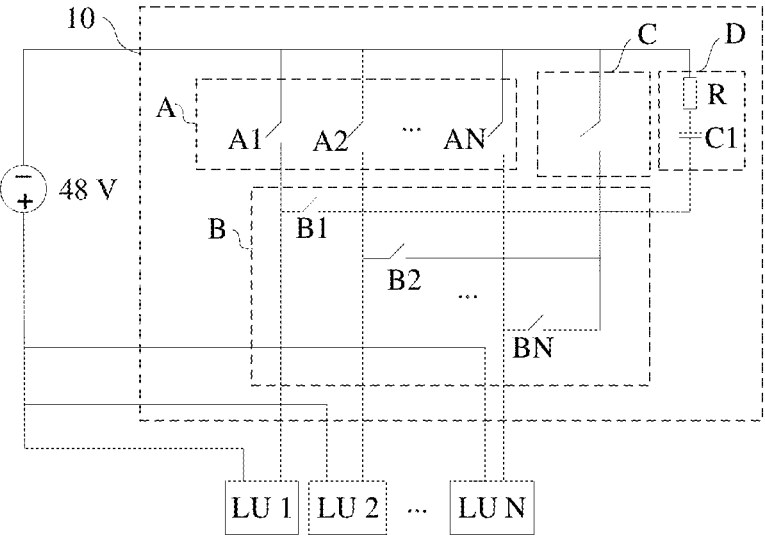
FIG. 4 is a schematic diagram of a structure of a power supply circuit according to an embodiment.

In a possible implementation, for example, the third switch is a relay, and the power supply circuit 10 provided in this embodiment may further include an absorption circuit D. As shown in FIG. 4, the absorption circuit D may be connected in parallel to the relay.

The absorption circuit D may include a resistor R and a capacitor C1. The resistor R may be connected in series to the capacitor C1.

It should be noted that the absorption circuit may also be referred to as a buffer circuit and may be configured to buffer a voltage and a current borne by the relay (that is, the third switch) at a moment when the relay is turned on and a moment when the relay is turned off.

In a possible implementation, the power supply circuit provided in this embodiment may include a plurality of third switches (that is, there may be a plurality of third switches C in FIG. 1). The following describes the power supply circuit by using an example in which each first switch and each second switch is a relay and an example of two MOS transistors (including a MOS 1 and a MOS 2, that is, two third switches).

Figure 5:
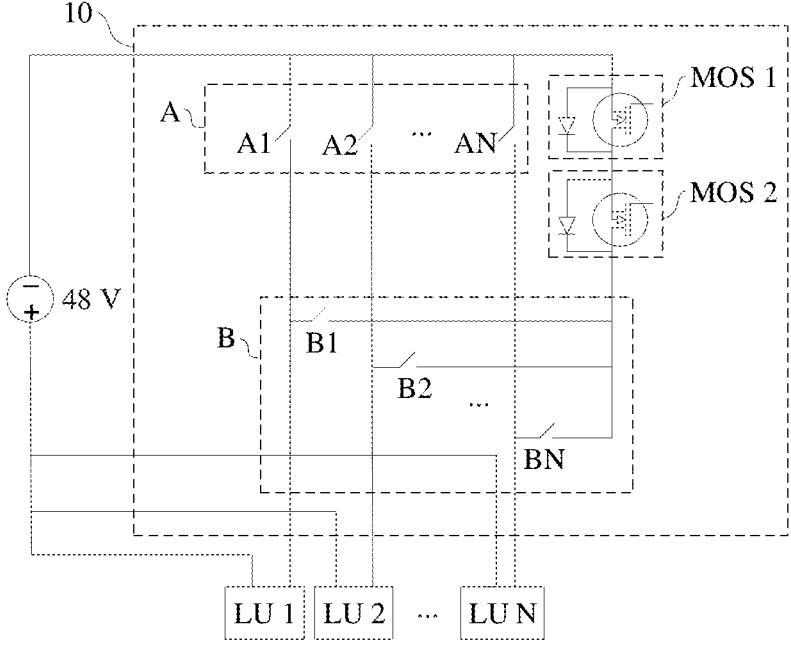
FIG. 5 is a schematic diagram of a structure of a power supply circuit according to an embodiment.

As shown in FIG. 5, similar to FIG. 3, a first end (that is, an upper end of each first switch in FIG. 5) of each first switch may be connected to a first end (that is, a negative end of the 48 V direct current power supply in FIG. 5) of a 48 V direct current power supply, and a second end (that is, a lower end of each first switch in FIG. 5) of each first switch may be connected to a first end (which may be a negative end of the load unit) of a corresponding load unit in the N load units. A first end (that is, a left end of each second switch in FIG. 5) of each second switch may be connected to the first end of the corresponding load unit. In other words, the second end of each first switch and the first end of each second switch are separately connected to the first end of the corresponding load unit.

Unlike FIG. 3, a source (that is, a first end of the MOS 1) of the MOS 1 may be connected to the first end of the 48 V direct current power supply, a drain (that is, a second end of the MOS 1) of the MOS 1 may be connected to a source (that is, a first end of the MOS 2) of the MOS 2, and a drain (that is, a second end of the MOS 2) of the MOS 2 may be connected to a second end of each second switch.

It should be noted that, the power supply circuit 10 shown in FIG. 5 may also include a control unit (CU), and each first switch, each second switch, the MOS 1, and the MOS 2 may be connected to the CU. In other words, the CU may control each first switch and each second switch in FIG. 5 to be turned on and turned off and may also control the MOS 1 and the MOS 2 in FIG. 5 to be turned on and turned off. In this way, hierarchical power-off of at least two corresponding load units (for example, a load unit LU 1 and a load unit LU 2) of N load units is implemented.

It should be noted that the CU may be connected to a control end of the MOS 1 and a control end of the MOS 2.

It should be noted that the power supply circuit provided in this embodiment implements the hierarchical power-off of the at least two load units of the plurality of load units, and may further implement hierarchical power-on of the at least two load units of the plurality of load units, so that impact on the power supply circuit and the direct current power supply is reduced.

Figure 6:
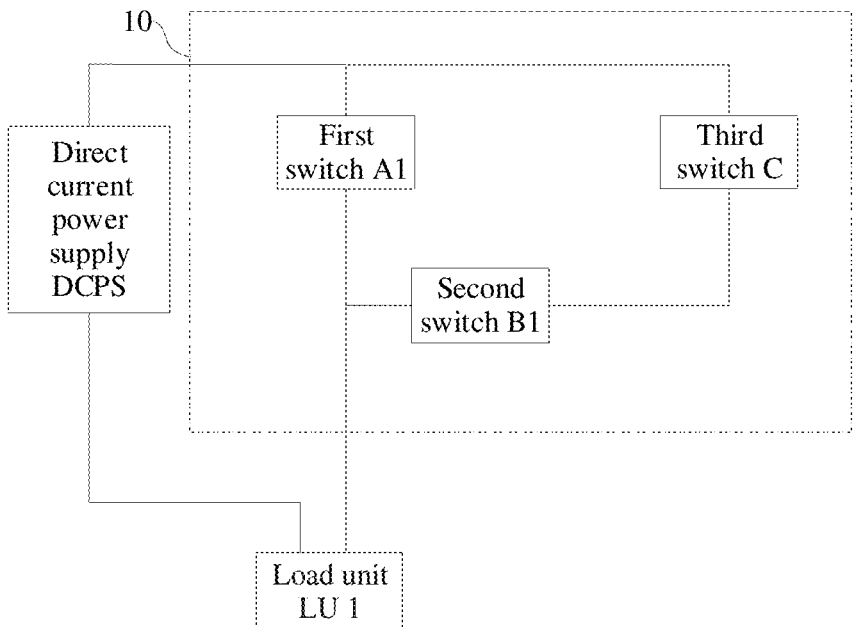
FIG. 6 is a schematic diagram of a structure of a power supply circuit according to an embodiment.

In an example, as shown in FIG. 6, the power supply circuit 10 provided in this embodiment may include one first switch (such as a first switch A1 in FIG. 6), one second switch (such as a second switch B1 in FIG. 6) and one third switch C.

Optionally, a first end (that is, an upper end of the first switch A1 in FIG. 6) of the first switch A1 may be connected to a first end (that is, an upper end of the direct current power supply DCPS in FIG. 6, which may be a negative end of the DCPS) of a direct current power supply DCPS, and a second end (that is, a lower end of the first switch A1 in FIG. 6) of the first switch A1 may be connected to a first end (which may be a negative end of the load unit LU 1) of a load unit LU 1. A first end (that is, a left end of the second switch B1 in FIG. 6) of the second switch B1 may be connected to the first end (that is, the second end of the first switch A1 and the first end of the second switch B1 are separately connected to the first end of the load unit LU 1) of the load unit LU 1, and a second end (that is, a right end of the second switch B1 in FIG. 6) of the second switch B1 may be connected to a second end (that is, a lower end of the third switch C in FIG. 6) of the third switch C. A first end (that is, an upper end of the third switch C in FIG. 6) of the third switch C may be connected to the first end of the direct current power supply DCPS, and a second end (that is, a lower end of the direct current power supply DCPS in FIG. 6, which may be a positive end of the direct current power supply DCPS) of the third switch C may be connected to a second end (which may be a positive end of the load unit LU 1) of the load unit LU 1.

Optionally, in the power supply circuit 10 shown in FIG. 6, the second switch B1 and the third switch C1 may be first controlled to be sequentially turned on. In this case, a bypass formed by the second switch B1 and the third switch C1 may be conducted, and there is no voltage at both ends of the first switch A1. In this case, no electric arc is generated in a process of turning off the first switch A1. Therefore, the first switch A1 is not damaged. In addition, the power supply circuit 10 does not need to be disposed with an arc extinguishing apparatus, so that the power supply circuit 10 is small in size and has low costs. In addition, reliability and security of the power supply circuit 10 can be improved.

Figure 7:
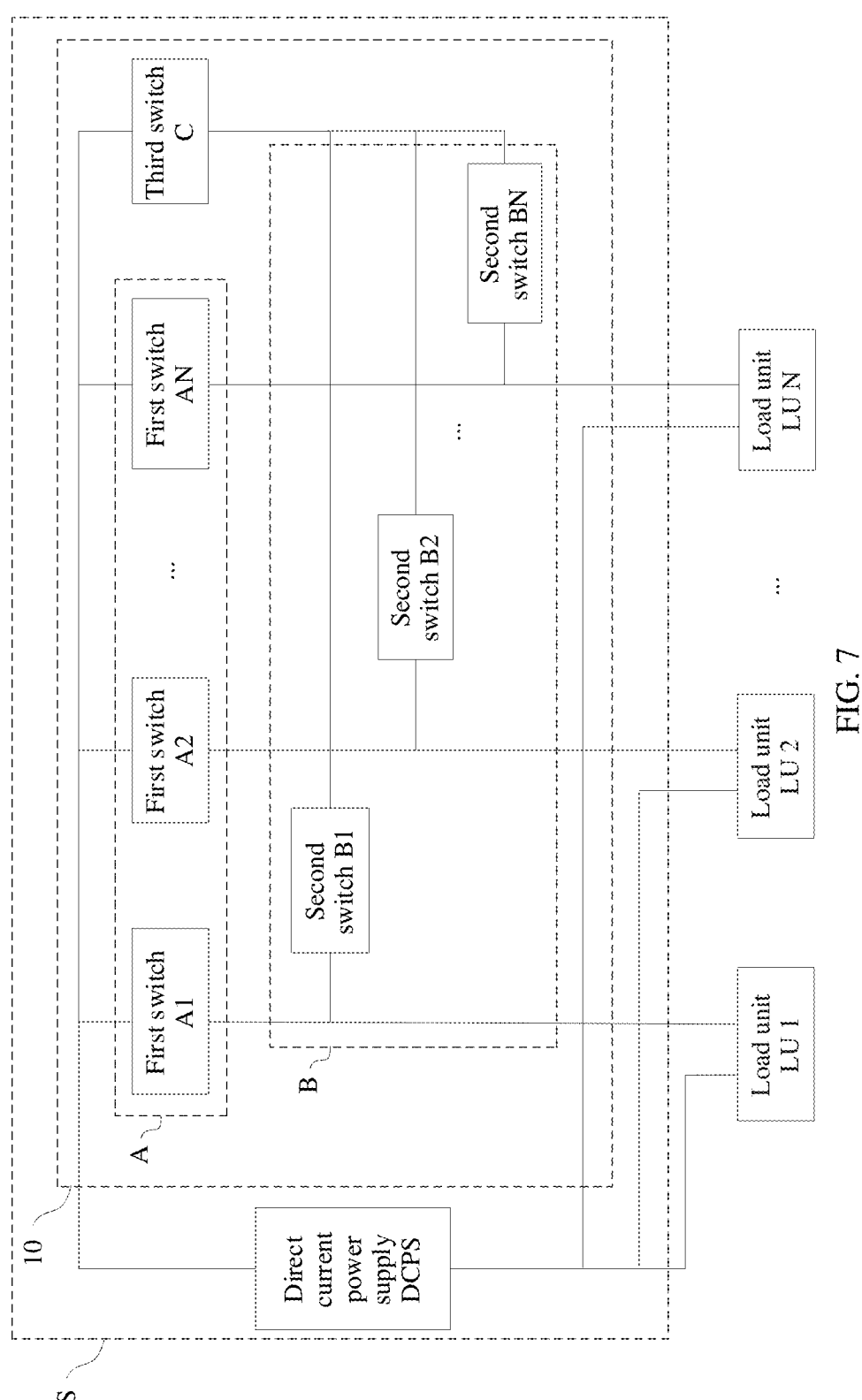
FIG. 7 is a schematic diagram of a structure of a communication power supply according to an embodiment.

An embodiment further provides a communication power supply, as shown in FIG. 7. In FIG. 7, a communication power supply S may include a direct current power supply (DCPS) and the power supply circuit 10 provided in the foregoing embodiments. One end of the DCPS (for example, a negative end of the d DCPS) may be connected to the power supply circuit 10, and the other end of the DCPS (for example, a positive end of the DCPS) and the power supply circuit 10 are separately connected to a plurality of load units.

Based on the foregoing connection relationship, it may be understood that the communication power supply 100 may be configured to control power supply of each of the plurality of load units through the DCPS and the power supply circuit.

It should be noted that, for detailed descriptions of the power supply circuit 10, refer to the foregoing description. Details are not described in this embodiment.

It should be further noted that the communication power supply provided in this embodiment includes the power supply circuit provided in the foregoing embodiments, so that the communication power supply has a lightning protection function. In addition, a size of the communication power supply may also be reduced, and costs of the communication power supply may be reduced.

Figure 8:
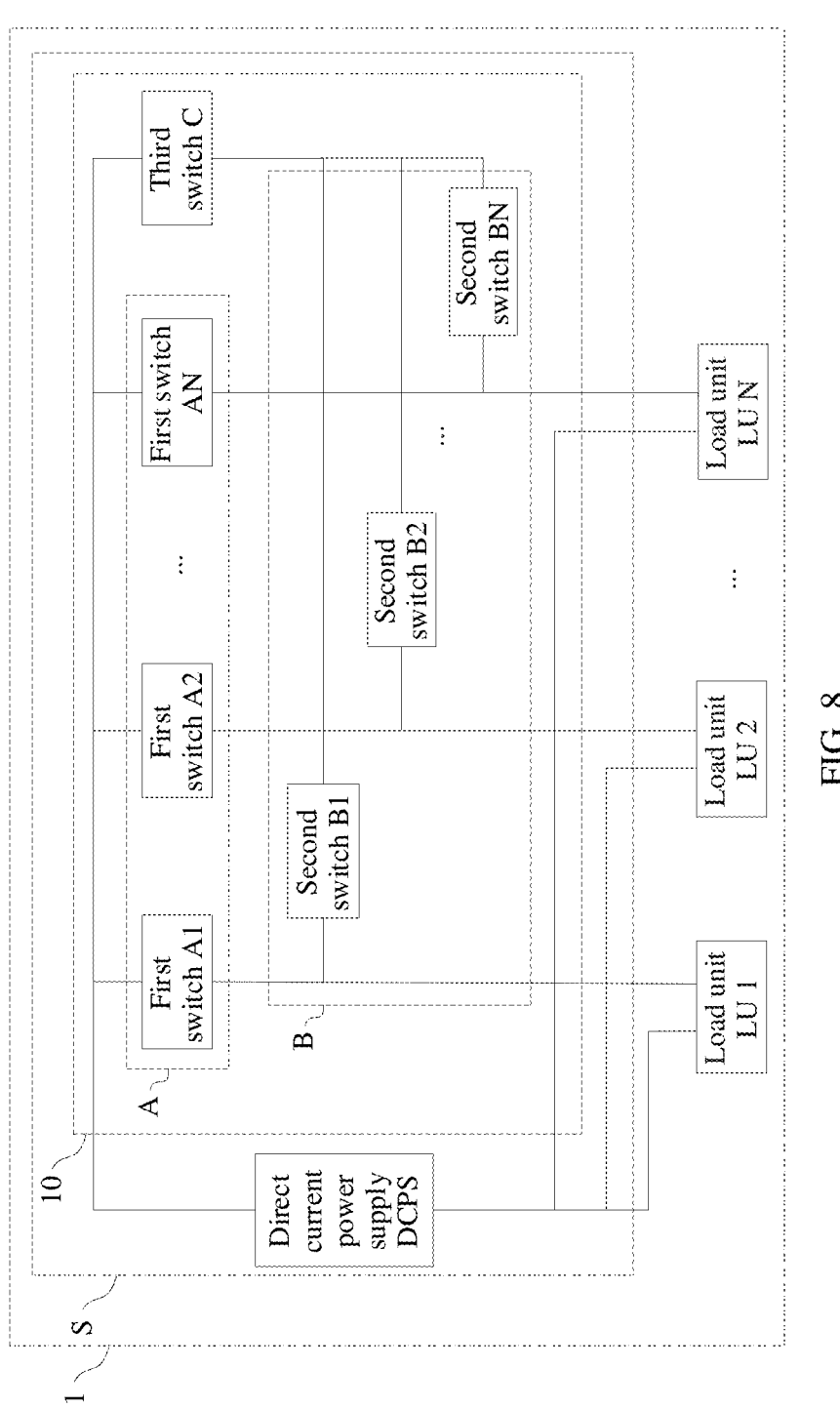
FIG. 8 is a schematic diagram of a structure of a communication base station according to an embodiment.

An embodiment further provides a communication base station. As shown in FIG. 8, a communication base station 1 may include N load units (that is, a load unit LU 1, a load unit LU 2, . . . , and a load unit LU N in FIG. 8) and a communication power supply S. The communication power supply S may be connected to each of the plurality of load units.

An embodiment provides a power supply circuit control method, and the method may be used to control the power supply circuit provided in the foregoing embodiments, to implement hierarchical power-off or hierarchical power-on of at least two load units of the plurality of load units.

When the power supply circuit works normally, a first switch corresponding to the load unit is turned on, to supply power to the load unit. As shown in FIG. 9, a control process 100 may include the following steps.

Step S101: Control a second switch (for example, a second switch B1, where the second switch B1 is, for example, a relay) corresponding to a first load unit (for example, a load unit LU 1) of the at least two load units to be turned on, and control a third switch (such as a third switch C, where the third switch C is, for example, a MOS transistor) to be turned on. Then, sequentially control a first switch (for example, a first switch A1, where the first switch A1 is, for example, a relay) corresponding to the load unit LU 1 to be turned off, the MOS transistor to be turned off, and the second switch (for example, the second switch B1)

corresponding to the load unit LU 1 to be sequentially turned off, to power off the load unit LU 1.

Step S102: Control a second switch (for example, a second switch B2, where the second switch B2 is, for example, a relay) corresponding to a second load unit (for example, a load unit LU 2) of the at least two load units to be turned on, control the MOS transistor to be turned on, and then sequentially control a first switch (for example, a first switch A2, where the first switch A2 is, for example, a relay) corresponding to the load unit LU 2 to be turned off, the MOS transistor to be turned off, and the second switch B2 to be sequentially turned off, to power off the load unit LU 2.

Hierarchical power-off of the load unit LU 1 and the load unit LU 2 may be implemented through the foregoing steps, so that a loss and operating costs of a communication base station are reduced.

It should be noted that, hierarchical power-off of another load unit in the plurality of load units may be implemented according to the foregoing process. Details are not described in this embodiment.

It should be further noted that, when a second switch corresponding to the load unit is turned on and the MOS transistor is turned on, a bypass formed by the second switch and the MOS transistor is conducted, and there is no voltage at both ends of the first switch. In this case, no electric arc is generated in a process of turning off the first switch. Therefore, the first switch is not damaged. In addition, the power supply circuit does not need to be disposed with an arc extinguishing apparatus, so that the power supply circuit is small in size and has low costs. In addition, reliability and security of the power supply circuit can be improved.

According to the power supply circuit control method provided in this embodiment, hierarchical power-off of the plurality of load units may be implemented by controlling a time sequence of turning on and turning off a plurality of first switches, a plurality of second switches, and the third switch.

In a possible implementation, the control method provided in this embodiment may further perform the following process:

Control the first switch (for example, the first switch A1) corresponding to the first load unit (for example, the load unit LU 1) and the first switch (for example, the first switch A2) corresponding to the second load unit (for example, the load unit LU 2) to be sequentially turned on, to implement hierarchical power-on of the load unit LU 1 and the load unit LU 2.

It should be noted that, hierarchical power-on of another load unit in the plurality of load units may be implemented according to the foregoing process. Details are not described in this embodiment.

It should be understood that, in the embodiments, sequence numbers of the foregoing processes do not mean execution sequences. The execution sequences of the processes should be determined based on functions and internal logic of the processes and should not be construed as any limitation on the implementation processes of the embodiments.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the embodiments may be implemented in a form of a software product. The software product is stored in a storage medium and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or a compact disc.

The foregoing descriptions are merely embodiments, but are not intended as limiting. Any variation or replacement readily figured out by a person skilled in the art shall fall within the scope of the embodiments.

What is claimed is:

1. A power supply circuit comprising:

a plurality of first switches, wherein the plurality of first switches is in a one-to-one correspondence with a plurality of load units;

a plurality of second switches, wherein the plurality of second switches is in a one-to-one correspondence with the plurality of load units; and a third switch, wherein a first end of each first switch is connected to a first end of a direct current power supply, a second end of each first switch is connected to a first end of a corresponding load unit in the plurality of load units, a first end of each second switch is connected to the first end of the corresponding load unit, a second end of each second switch is connected to a second end of the third switch, a first end of the third switch is connected to the first end of the direct current power supply, and a second end of the direct current power supply is connected to a second end of each of the plurality of load units.

2. The power supply circuit according to claim 1, further comprising:
a control unit, wherein the control unit is connected to each of the plurality of first switches, each of the plurality of second switches, and the third switch and configured to control at least two first switches of the plurality of first switches, at least two corresponding second switches of the plurality of second switches, and the third switch to be turned on or turned off.

3. The power supply circuit according to claim 1, wherein each first switch is a relay or a contactor.

4. The power supply circuit according to claim 3, wherein each second switch is any one of a relay, a contactor, or a semiconductor switch.

5. The power supply circuit according to claim 4, wherein the third switch is any one of a relay, a contactor, and a semiconductor switch.

6. The power supply circuit according to claim 4, wherein the semiconductor switch is an insulated gate bipolar transistor, an insulated gate field-effect transistor, or a triode.

7. The power supply circuit according to claim 5, wherein the semiconductor switch is an insulated gate bipolar transistor, an insulated gate field-effect transistor, or a triode.

8. The power supply circuit according to claim 1, further comprising:
an absorption circuit connected in parallel to the third switch, wherein the absorption circuit comprises a resistor and a capacitor that are connected in series.

9. The power supply circuit according to claim 2, further comprising:
an absorption circuit connected in parallel to the third switch, wherein the absorption circuit comprises a resistor and a capacitor that are connected in series.

10. A communication power supply, comprising:
a direct current power supply; and
a power supply circuit, wherein the direct current power supply is connected to the power supply circuit, the direct current power supply and the power supply circuit are separately connected to a plurality of load units, the communication power supply is configured to supply power to each of the plurality of load units through the direct current power supply and the power supply circuit, and the power supply circuit comprises:
a plurality of first switches, wherein the plurality of first switches is in a one-to-one correspondence with a plurality of load units,
a plurality of second switches, wherein the plurality of second switches are in a one-to-one correspondence with the plurality of load units, and
a third switch, wherein a first end of each first switch is connected to a first end of the direct current power supply, a second end of each first switch is connected to a first end of a corresponding load unit in the plurality of load units, a first end of each second switch is connected to the first end of the corresponding load unit, a second end of each second switch is connected to a second end of the third switch, a first end of the third switch is connected to the first end of the direct current power supply, and a second end of the direct current power supply is connected to a second end of each of the plurality of load units.

11. The communication power supply according to claim 10, wherein the power supply circuit further comprises:

a control unit connected to each of the plurality of first switches, each of the plurality of second switches, and the third switch and configured to control at least two first switches of the plurality of first switches, at least two corresponding second switches of the plurality of second switches, and the third switch to be turned on or turned off.

12. The communication power supply according to claim 10, wherein each first switch is a relay or a contactor.

13. The communication power supply according to claim 12, wherein each second switch is any one of a relay, a contactor, or a semiconductor switch.

14. The communication power supply according to claim 13, wherein the third switch is any one of a relay, a contactor, and a semiconductor switch.

15. The communication power supply according to claim 13, wherein the semiconductor switch is an insulated gate bipolar transistor, an insulated gate field-effect transistor, or a triode.

16. The communication power supply according to claim 14, wherein the semiconductor switch is an insulated gate bipolar transistor, an insulated gate field-effect transistor, or a triode.

17. The communication power supply according to claim 10, wherein the power supply circuit further comprises:
an absorption circuit connected in parallel to the third switch and the absorption circuit comprises a resistor and a capacitor that are connected in series.

18. The communication power supply according to claim 10, wherein the power supply circuit further comprises:
an absorption circuit connected in parallel to the third switch and the absorption circuit comprises a resistor and a capacitor that are connected in series.

19. A method used to control a power supply circuit comprising:
a plurality of first switches, wherein the plurality of first switches is in a one-to-one correspondence with a plurality of load units,
a plurality of second switches, wherein the plurality of second switches are in a one-to-one correspondence with the plurality of load units; and
a third switch, wherein a first end of each first switch is connected to a first end of a direct current power supply, a second end of each first switch is connected to a first end of a corresponding load unit in the plurality of load units, a first end of each second switch is connected to the first end of the corresponding load unit, a second end of each second switch is connected to a second end of the third switch, a first end of the third switch is connected to the first end of the direct current power supply, and a second end of the direct current power supply is connected to a second end of each of the plurality of load units, and the method comprises:
controlling a second switch corresponding to a first load unit in at least two load units and a third switch to be sequentially turned on, and controlling a first switch corresponding to the first load unit, the third switch, and the second switch corresponding to the first load unit to be sequentially turned off, to power off the first load unit;
controlling a second switch corresponding to a second load unit in the at least two load units and the third switch to be sequentially turned on; and
controlling a first switch corresponding to the second load unit, the third switch, and the second switch corresponding to the second load unit to be sequentially turned off, to power off the second load unit.

20. The method according to claim 19, further comprising:

controlling the first switch corresponding to the first load unit and the first switch corresponding to the second load unit to be sequentially turned on, to implement hierarchical power-on of the first load unit and the second load unit.

* * * * *